United States Patent [19]
Ebbinghaus et al.

[11] Patent Number: 5,259,268
[45] Date of Patent: Nov. 9, 1993

[54] HOLLOWSHAFT AND METHOD FOR THE PRODUCTION THEREOF

[75] Inventors: Alfred Ebbinghaus; Helmut Bögel, both of Aalen, Fed. Rep. of Germany

[73] Assignee: Gesenkschmiede Schneider GmbH, Aalen, Fed. Rep. of Germany

[21] Appl. No.: 908,932

[22] Filed: Jul. 6, 1992

Related U.S. Application Data

[63] Continuation of Ser. No. 754,328, Sep. 4, 1991, abandoned, which is a continuation of Ser. No. 622,357, Dec. 4, 1990, abandoned, which is a continuation of Ser. No. 274,809, filed as PCT/DE88/00034, Jan. 22, 1988, published as WO88/06248, Aug. 25, 1988, abandoned.

Foreign Application Priority Data

Oct. 2, 1987 [DE] Fed. Rep. of Germany ....... 3704092

[51] Int. Cl.$^5$ .................. F16H 53/00; B21D 39/00
[52] U.S. Cl. .................. 74/567; 29/523; 29/522.1; 29/888.1; 123/90.6
[58] Field of Search ............ 74/567, 569; 29/523, 29/522.1, 888.1; 419/8; 123/90.6, 590

[56] References Cited

U.S. PATENT DOCUMENTS

| | | | |
|---|---|---|---|
| 4,660,269 | 4/1987 | Suzuki | 74/567 |
| 4,783,898 | 11/1988 | Kanamaru et al. | 29/523 |

FOREIGN PATENT DOCUMENTS

| | | | |
|---|---|---|---|
| 2336241 | 2/1975 | Fed. Rep. of Germany | |
| 2546802 | 8/1979 | Fed. Rep. of Germany | |
| 3409541 | 11/1985 | Fed. Rep. of Germany | 123/90.6 |
| 3616901 | 11/1986 | Fed. Rep. of Germany | |
| 3620435 | 12/1986 | Fed. Rep. of Germany | 74/567 |
| 3633435 | 4/1988 | Fed. Rep. of Germany | 74/567 |
| 2469610 | 5/1981 | France | |
| 2488354 | 2/1982 | France | |
| 0236965 | 10/1986 | Japan | 74/567 |
| 1232338 | 5/1986 | U.S.S.R. | 74/567 |
| 2050207 | 1/1981 | United Kingdom | 74/567 |

*Primary Examiner*—Vinh T. Luong
*Attorney, Agent, or Firm*—Kalish & Gilster

[57] ABSTRACT

A hollow shaft with torque-transmitting structural elements such as toothed gears, cams, disc cams, etc., is optionally provided with secondary shaping elements, such as bearing points, stop faces, hexagonal or ring contours, etc. The new shaft is formed from a starting pipe with a substantially uniform wall thickness, which is widened for the positive (form locking) and non-positive (force-fit) connection to the structural elements and for shaping the secondary shaping elements by internal pressure. The maximum widening of the pipe is under the structural elements or on the secondary shaping elements. The new hollow shaft is characterized in that the wall thickness of pipe (12) under the structural elements (14,18) and optionally secondary shaping elements (16,20) is partly enlarged in the axial direction by material flow compared with the wall thickness of the starting pipe.

7 Claims, 2 Drawing Sheets

HOLLOWSHAFT AND METHOD FOR THE PRODUCTION THEREOF

This application is a continuation of application Ser. No. 07/754,328, filed Sep. 4, 1991, now abandoned, which continuation of application Ser. No. 07/622,357, filed Dec. 4, 1990 now abandoned, which is a continuation of application Ser. No. 07/274,809 filed as PCT/DE88/00034, Jan. 22, 1988, published as WO88/06248, Aug. 25, 1988, (abandoned).

BACKGROUND AND SUMMARY OF THE INVENTION

The invention relates, in general, to hollow shafts provided with torque-transmitting structural elements such as toothed gears, cams, disk cams, etc., and more particularly, to a hollow shaft providing a support body constructed as a separate component from the torque transmitting structural elements.

DESCRIPTION OF THE PRIOR ART

Hollow shafts produced from several parts by joining are also called built-up hollow shafts.

German Patent Application DE-OS 34 09 541 discloses a hollow shaft, in which the constructional elements are non-positively joined to the shaft or pipe by applying an internal pressure. The pipe is widened more between the structural elements than beneath them, so that necessarily there is a greater pipe wall thickness under the structural elements than between them. The method described therein requires relatively high inner pipe wall thicknesses and its thickness decreases between the structural elements.

German Patent 25 46 802 discloses camshafts for reciprocating piston engines with the aforementioned features, in which an inner pipe or tube is shaped to such an extent that its outer wall extends into grooves provided within the ring bearings, cams, etc. and in this way a self-closure is obtained. Here again it is necessary to use relatively easily deformable pipes for obtaining a pure self-closure, the maximum widening of the pipe taking place under the structural elements. In the case of this hollow shaft there is a reduction in the inner pipe wall thickness beneath the structural elements, which leads to a weakening of the pipe beneath the same. It is therefore necessary to use the inner pipe with a corresponding large wall thickness.

An object of the present invention is to produce hollow shafts with force-transmitting structural elements, which permit the transmission of a higher torque, while saving weight and using inexpensive starting products.

Accordingly, in furtherance of such object, the invention comprises a hollow shaft with at least one torque-transmitting structural element (e.g., toothed gear, cam, disc cam, etc.) and at least one secondary shaping element (e.g., bearing point, stop face, hexagonal or ring contour, etc.) mounted along the length thereof, the shaft being formed from a starting tube having a substantially uniform wall thickness which is widened by internal pressure for at least non-positive, force-fit connection to the structural element and for shaping the secondary shaping element, the maximum widening of the tube being under the structural element, and wherein the wall thickness under at least one of the structure element and secondary shaping element is partly axially enlarged by material accumulation compared with the wall thickness of the starting tube. It is advantageous if the material accumulation in the pipe under the structural elements is between 1 and 10% and is preferably between 2 and 8%, and in most especially preferred manner between 3 and 7.5%, based on the wall thickness of the starting tube. This material accumulation can be obtained without impairing a favorable fiber flow in the pipe and while achieving a better fixing of the structural elements than in the prior art and with a reduced weight compared with the prior art. By the term secondary shaping elements is here understood to mean a hexagonal contour, cam or dog contour, etc. which are constituted by tube areas with a special external configuration.

Such secondary shaping contours could not be produced with the hitherto known methods simultaneously with the joining of the structural elements and required additional complicated reworking for applying e.g. hexagonal profiles to hollow shafts, such as are required for handling in the motor vehicle field. The secondary shaping elements can be designed in such a way that they also have a wall reinforcement compared with the original wall thickness, but shaping can also take place in such a way that, independently of the loading and the external shape of the shaping element, the wall thickness of the secondary shaping element is roughly the same or less than the original tube wall thickness. However, the invention makes it possible simultaneously with the fixing of structural elements to provide shaped secondary shaping elements on a tube, so that manufacturing costs can be considerably reduced.

It has been found that, according to the invention, the shaping of bearing points from the tube is possible, a larger bearing being manufacturable by joining a ring to the tube.

The structural elements can be essentially of material selected from the group consisting of cast iron, chilled cast iron, sintered steel, steel (e.g. fine stamped metal parts or sectional steel), aluminum, titanium, ceramic and plastics. It is in particular possible to use wear-resistant or lightweight materials, optionally also for special uses plastics with special characteristics, which can be chosen without particular dependence on the remaining hollow shaft material. This constitutes a considerable advance compared with conventional cast shafts.

The opening of the structural elements can be oval, polygonal or otherwise non-circular, but also circular. In the case of non-circular or polygonal openings, on widening the tube there is an additional fixing of the structural elements by self-closure thereof with the noncircular bulge formed in the tube, which leads to an additional fixing and permits the transmission of higher forces.

Hollow shafts with the structural elements fixed thereto according to the invention can be manufactured without accurate fits on the joining faces, i.e. the contact faces between the structural element inner wall and the tube outer wall. The joining rfaces of the joined parts consequently do not need reworking. As all the outer joined parts are fixed with their outer contour in a tool, only a slight shape and position divergence occurs even with a bore displacement of the outer joined parts. If the shape of the cam opening is not completely adapted to the outer contour of the tube, a positive and non-positive connection is obtained, which leads to superior force transmission characteristics in the case of such shafts.

A further weight reduction results from the fact that larger openings, e.g., oval in place of circular openings, than necessary are provided in the structural elements. For other requirements it can be price-advantageous to use structural elements with easily manufacturable, circular inner bores.

The method for the manufacture of the hollow shaft according to the invention involves the following steps: inserting the structural element or elements and a tube placed through the inner opening of each said element into a mold; closing the mold; closing the tube front faces and applying a pressure adequate for deforming the tube material to the interior of the tube while simultaneously with the application of the internal pressure, axial forces are applied to the tube accompanied by material follow-up in the direction of the tube axis. Advantageously the flow of material can take place by means of tool components movable in the tube axis direction.

Another advantage of the built-up hollow shaft of the invention is that it avoids rotary oscillations as a result of the differently shaped tube zones.

A multiply differing shaping of the tube (under the cams in the case of an oval cam bore, e.g. oval, bearing points which are bulged, etc.) ensures that stiff shafts can be manufactured from thin tubes. The tube can also be shaped between the joined parts, e.g., stiffening ribs are formed.

Through the material accumulation under the critical connection points, the stability of the shape produced during the forming process is further increased and compressive stresses are applied, which once again increases the security of the fixing of the structural elements.

DESCRIPTION OF THE PREFERRED EMBODIMENT

Figure 1:
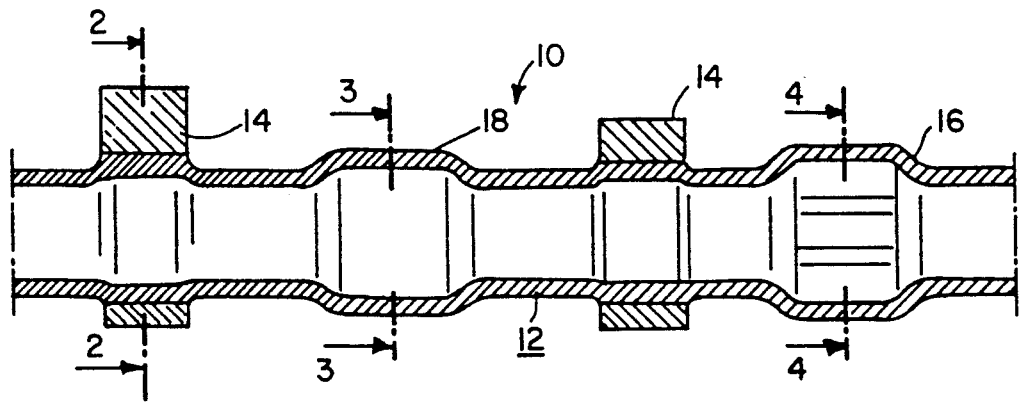
FIG. 1 is a diagrammatic representation of a preferred embodiment of an inventive hollow camshaft in longitudinal section in accordance with the invention, as taken along line I—I of FIG. 5.
Figure 2:
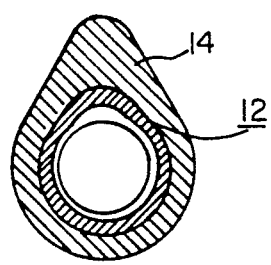
FIG. 2 is a cross-section through a cam end hollow shaft according to FIG. 1 along line II—II.
Figure 3:
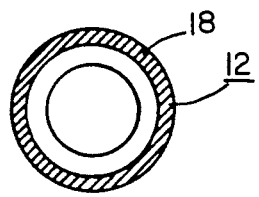
FIG. 3 is a cross-section through a bearing of the hollow shaft according to FIG. 1 along line III—III of FIG. 1.
Figure 4:
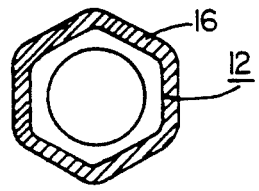
FIG. 4 is a cross-section through a shaped-on hexagon of the hollow shaft according to FIG. 1 along line IV—IV.
Figure 5:
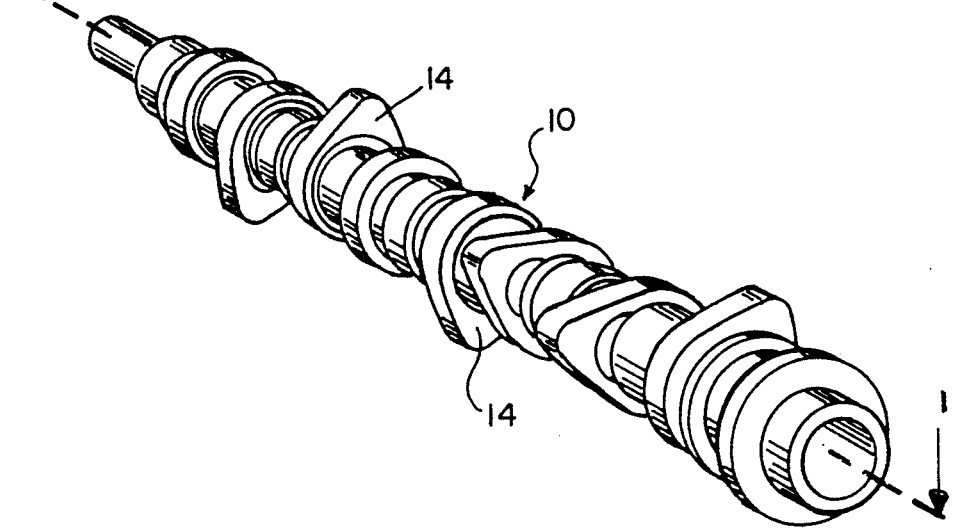
FIG. 5 is a perspective view of a hollow camshaft according to the invention.

As shown in FIG. 1, a camshaft 10 can have different constructional elements along the length of a tube, i.e., a metal pipe, 12. By widening the pipe, as shown in FIG. 2, under a cam 14 with an oval cam bore nonrotary connection takes place to the structural element. Cam 14 is fixed to the pipe both by non-positive, force-fit connection between the pipe wall and the cam bore inner wall and by self-closure, form-locking by oval distortion within cam 14. Simultaneously a bearing 18 is shaped out of pipe 12, as shown in cross-section in FIG. 3. It is also possible to simultaneously shape a setting hexagon 16, as shown in the cross-section of FIG. 4. The hollow camshaft 10 permits the transmission of comparatively high torques for low weight and good running qualities.

Figure 6:
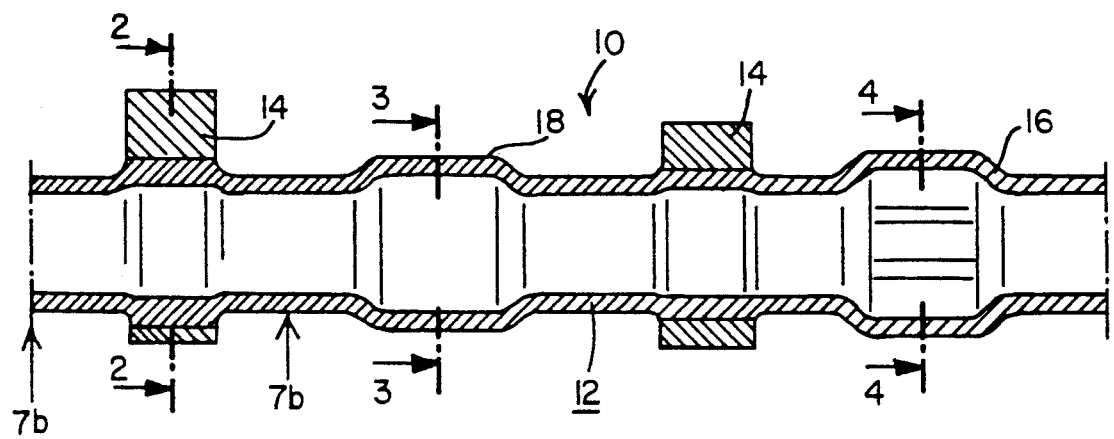
FIG. 6 is a longitudinal sectional view of the camshaft of FIG. 1 but with a segment of the pipe between the arrows 7b shown in slightly exaggerated thickened form.
Figure 7A:
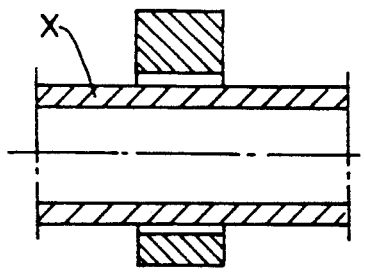
FIG. 7a is a segment of the camshaft shown in FIG. 6 corresponding to the portion between arrows 7b, prior to thickening of pipe 12.
Figure 7B:
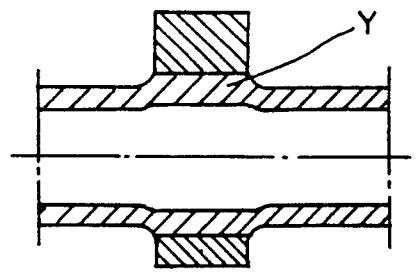
FIG. 7b is the segment of FIG. 7a, after thickening of pipe 12, shown slightly enlarged for clarity.

Thus, the invention provides a hollow shaft with at least one torque-transmitting structural element 14 and at least one secondary shaping element 18 mounted along the length thereof, the hollow shaft being formed from a starting tube having a substantially uniform wall thickness, for example, as at X in FIG. 1 and FIG. 7a. The wall thicknesses are widened by internal pressure at least for non-positive, force-fit connection to the structural element and for shaping the secondary shaping element. Thus, the maximum widening of the tube is under at least one of the structural element (e.g., 14) and secondary shaping element (e.g., 18) is partly enlarged in the axial direction by material flow accumulation to provide an enlarged wall thickness as compared with the wall thickness of the starting tube (shown in exaggerated fashion for clarity in FIGS. 6 and 7b, at Y).

The partial enlargement of the wall thickness of the pipe exclusively occurs under such elements (14,18) and preferably the structural element (14).

Such material accumulation of the tube under an element is between 1 and 10%, more preferably between 2 and 8%, and most specially preferred manner between 3 and 7.5%, based on the starting wall thickness of the tube.

The structural element is a material selected from the group consisting of cast iron, chilled cast iron, sintered steel, steel, aluminum, titanium, ceramic and plastics.

A method for the production of such a hollow shaft includes the steps of inserting the structural element or elements and a pipe passed through the inner opening of the structural elements into a mold, closing the mold, closing the pipe front faces and applying a pressure adequate for deforming the pipe material into the interior of the pipe characterized in that simultaneously with the application of the internal pressure axial forces are applied to the pipe accompanied by material follow-up in the direction of the pipe axis.

The method may be further characterized in that the material accumulation takes place by means of tool elements movable in the axial direction of the pipe.

According to one aspect of the invention the starting tube is widened for positive, form-locking connection to said structural element. Thus, the starting tube may be widened by oval distortion within the structural member, as shown.

What is claimed is:

1. Hollow shaft with at least one torque-transmitting structural element and at least one secondary shaping element mounted along the length thereof, said hollow shaft being formed from a starting tube having a substantially uniform wall thickness, said wall thickness being widened by internal pressure at least for non-positive force-fit connection to the at least one structural element and for shaping the at least one secondary shaping element, the maximum widening of the tube being under the at least one structural element and the at least one secondary shaping element, characterized in that the wall thickness of the tube under the at least one structural element and the at least one secondary shaping element is partly enlarged in the axial direction by material flow accumulation to provide an enlarged wall thickness as compared with the wall thickness of the starting tube, the material accumulation of the tube under the at least one of the structural element and the at least one secondary shaping element is between 1 and 10% based on the starting wall thickness of the tube.

2. Hollow shaft according to claim 1, characterized in that the at least one structural element is a material selected from the group consisting of cast iron, chilled case iron, sintered steel, steel, aluminum, titanium, ceramic and plastics.

3. Hollow shaft according to claim 3, characterized in that said material accumulation is between 2 and 8%, based on said starting wall thickness.

4. Hollow shaft according to claim 3, characterized in that said material accumulation is between 3 and 7.5%, based on said starting wall thickness.

5. Hollow shaft according to claim 1, characterized in that the starting tube is widened for positive, form-locking connection to said structural element.

6. Hollow shaft according to claim 5, characterized in that the starting tube is widened by oval distortion within the structural member.

7. Hollow shaft with at least one torque-transmitting structural element and at least one secondary shaping element mounted along the length thereof, said hollow shaft being formed from a starting tube having a substantially uniform wall thickness, said wall thickness being widened by internal pressure at least for non-positive, forced-fit connection to the at least one structural element and for shaping the at least one secondary element, the maximum widening of the tube being under the at least one structural element and the at least one secondary shaping element, characterized in that the wall thickness of the tube under the at least one structural element and the at least one secondary shaping element is partly enlarged in the axial direction by material flow accumulation to provide an enlarged wall thickness as compared with the wall thickness of the starting tube, and further characterized in that the material accumulation of the tube under the at least one structural element and the at least one secondary shaping element is between 1 and 10%, based on the starting wall thickness of the tube.

* * * * *

UNITED STATES PATENT AND TRADEMARK OFFICE
CERTIFICATE OF CORRECTION

PATENT NO.   :   5,259,268

DATED        :   November 9, 1993

INVENTOR(S)  :   A. Ebbinghaus et al

It is certified that error appears in the above-identified patent and that said Letters Patent is hereby corrected as shown below:

Title page, items [19] and [54]:

Change "HOLLOWSHAFT" to read --HOLLOW SHAFT--.

Signed and Sealed this

Twenty-ninth Day of March, 1994

Attest:

BRUCE LEHMAN

Attesting Officer     Commissioner of Patents and Trademarks